US011947317B1

(12) United States Patent
Chen (10) Patent No.: US 11,947,317 B1
(45) Date of Patent: Apr. 2, 2024

(54) INTERCHANGEABLE SMARTWATCH COVER

(71) Applicant: Prime Art & Jewel, Inc., Dallas, TX (US)

(72) Inventor: Dillon Chen, Dallas, TX (US)

(73) Assignee: PRIME ART & JEWEL, INC., Dallas, TX (US)

( * ) Notice: Subject to any disclaimer, the term of this patent is extended or adjusted under 35 U.S.C. 154(b) by 795 days.

(21) Appl. No.: 17/028,993

(22) Filed: Sep. 22, 2020

Related U.S. Application Data (60) Provisional application No. 62/903,883, filed on Sep. 22, 2019.

(51) Int. Cl.
*G04B 37/00* (2006.01)
*H04B 1/3888* (2015.01)

(52) U.S. Cl.
CPC .......... *G04B 37/005* (2013.01); *H04B 1/3888* (2013.01)

(58) Field of Classification Search
CPC .. G04B 37/005; G04B 37/22; G04B 37/0058; G04B 37/1486; H04B 1/3888; H04B 1/38; H04B 1/3827; A45C 11/12; A45C 11/10

See application file for complete search history.

(56) References Cited

U.S. PATENT DOCUMENTS

| | | | | |
|---|---|---|---|---|
| 4,396,298 A | * | 8/1983 | Ripley | G04B 37/1486 968/452 |
| 5,206,841 A | * | 4/1993 | Boucheron | G04B 37/005 368/283 |
| 9,737,123 B2 | * | 8/2017 | Wright | A45C 13/008 |
| 10,261,547 B1 | * | 4/2019 | DiMeglio | G06F 1/163 |
| 11,422,507 B2 | * | 8/2022 | Wang | G04B 37/22 |
| 2017/0248922 A1 | * | 8/2017 | Hynecek | A45C 11/12 |

* cited by examiner

*Primary Examiner* — Edwin A. Leon
(74) *Attorney, Agent, or Firm* — OSTROLENK FABER LLP (57) ABSTRACT

In various implementations, smartwatch covers may be provided that fit a smartwatch. The smartwatch cover may include an inner flexible cover and an outer cover. A user may select a smartwatch cover to couple to a smartwatch case, and then remove the smartwatch cover or a portion thereof and couple a new smartwatch cover or portion thereof to the smartwatch case. The replacement of the smartwatch cover may be performed a plurality of times without substantially damaging the smartwatch and/or the smartwatch cover.

20 Claims, 8 Drawing Sheets

INTERCHANGEABLE SMARTWATCH COVER

CROSS-REFERENCE TO RELATED APPLICATIONS

This application claims the benefit of priority to U.S. Provisional Patent Application No. 62/903,883 entitled "Interchangeable Smartwatch Cover" and filed on Sep. 22, 2019, which is hereby incorporated by reference for al purposes.

TECHNICAL FIELD

The present invention relates to smartwatch covers.

BACKGROUND

Smartwatches which often include computers to control the functionality of the watch are commonly more prone to non-aesthetic damage (e.g., breakage and/or scratches that reduce functionality) than mechanical watches, which may become scratched but still operate. In addition, unlike mechanical watches, smart watches tend to vary little in terms of appearance. While watches (mechanical and smartwatches) are used to provide a function, such as telling time or with respect to smartwatches allowing communication (calls, texts, etc.) and/or retrieval of information (e.g., weather, email, website data, etc.), watches also serve as a fashion accessory.

SUMMARY

In various implementations, a smartwatch case may be provided that fits on a smartwatch. The smartwatch case or portions thereof may be interchangeable such that a user may change the appearance of the smartwatch (e.g., to allow the watch to serve as a fashion accessory) and increase user satisfaction with the smartwatch. The interchangeable smartwatch case may be unibody and/or formed from more than one component (e.g., inner cover and outer cover).

In various implementations, a watch cover may include an inner cover and an outer cover. The outer cover may be decorative. Thus, the user may be switch outer covers while the inner cover remains coupled to a smartwatch. The inner cover may be capable of coupling with a smartwatch case such that the smartwatch case is retained in the inner cover. The inner cover includes a base with an opening that is disposed through the base. The base may cover at least a portion of a bezel of the smartwatch disposed in the inner cover. The opening may have a smaller length and/or a smaller width than the smartwatch case disposed in the inner cover. The inner cover may include one or more side walls extending from the base. A cavity disposed between the one or more side walls and the base. A side wall may curve inward towards the cavity. A width of the cavity opening may be greater than a width of the opening in the base (e.g., such that the smartwatch case does not fall through the front opening of the inner cover). The inner cover may be at least partially flexible (e.g., to facilitate insertion of a smartwatch into the inner cover). The outer cover may receive at least a portion of the inner cover. The outer cover may include an outer base with an outer opening disposed through the outer base and one or more side walls. The outer opening may at least partially aligns with the opening of the inner cover (e.g., such that a face of the smartwatch may be visible and/or functionally accessible). Outer side walls may extend from the outer base. An outer cavity may be disposed between the one or more outer side walls and the outer base. The outer cavity may receive an inner cover coupled to a smartwatch case. Outer side wall(s) may curve inward towards the outer cavity, in some implementations. The outer cover may be at least partially rigid. The outer cover may be frictionally retained on the inner cover.

Implementations may include one or more of the following features. At least a portion of a face of a smart watch disposed in the inner cover may be viewable and/or functionally accessible (e.g., a touch screen may be operable, etc.) through the opening of the base. The side wall(s) may include aperture(s) that may provide access to components of the smartwatch disposed in the inner cover. For example, access to buttons, sliders, and/or other input features of a smartwatch may be via apertures in the side wall(s). In some implementations, the access to buttons, sliders, and/or other input features of a smartwatch may be through the side wall (e.g., the sidewall may be pushed to push a button). One or more of the side walls may not extend past the bands of the smartwatch coupled to the inner cover, in some implementations, when the smart watch is coupled to the inner cover. For example, watch bands may be switched without removing the outer and/or inner covers. The inner cover may be deformable from a first shape to receive the smartwatch case; and wherein the inner cover is capable of returning to the first shape when the smartwatch case is disposed in the inner cover or when the smartwatch case is removed from the cover. The base may cover at least a portion of at least one edge of a crystal of the smartwatch disposed in the inner cover. Side wall(s) of the inner cover may extend to the back side of the smartwatch (e.g., the side opposed to the face of a smartwatch), when the smartwatch is disposed in the inner cover. The outer opening of the outer cover may be smaller in width and length than the opening in the inner cover. The outer surface of the outer cover may include inset stones and/or other decorative elements. The outer cover may not have a similar outer shape as the smartwatch case (e.g., to allow a user to change the shape of an overall watch case by using a cover). The inner cover may be at least partially compressed when disposed in the outer cover. Compression may allow the outer cover to frictionally fit with the inner cover and retain the outer cover on the inner cover. The outer and inner case may at least partially absorb impacts to inhibit damage to the smartwatch. The side wall(s) of the inner cover may deflect to allow insertion of the smartwatch case in the inner cover. The inner cover may include a back opposed to the base and coupled to one or more of the side walls. The back may include an opening (e.g., to retain the smartwatch in the inner cover). The opening may be deformable to allow a smartwatch case to be disposed in the inner case. The side walls of at least one of the inner cover or outer cover may not inhibit removal of the smartwatch bands. The inner case may be configured such that arms of the smartwatch do not need to be removed to couple the smartwatch case and the inner case.

In various implementations, an interchangeable watch cover kit may include an inner cover and one or more outer covers. Outer covers may be uncouplable from the inner cover such that one of the outer covers may be replaced and coupled to the inner cover with another one of the outer covers in the kit. The kit may include outer covers that are different (e.g., in appearance, in material, etc.).

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

In various implementations, smartwatch cover may be interchangeable to allow a user to customize the appearance of a smartwatch and/or facilitate replacement of damaged covers. For example, a user may desire to change the smartwatch cover as a fashion accessory daily. As another nonlimiting example, a user may desire to change the smart watch cover to match events (e.g., work vs evening events, sports vs work, etc.) and/or mood.

Figure 1A:
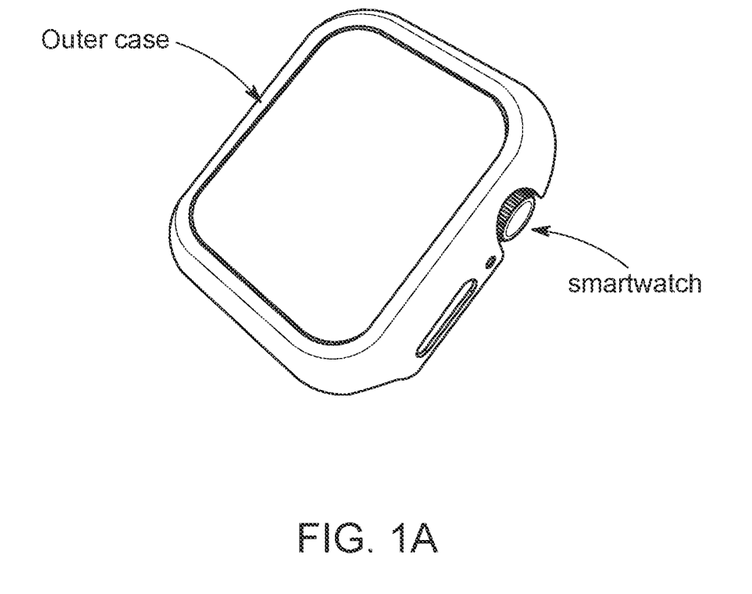
FIG. 1A illustrates an implementation of an example smartwatch cover on a smartwatch case.
Figure 1B:
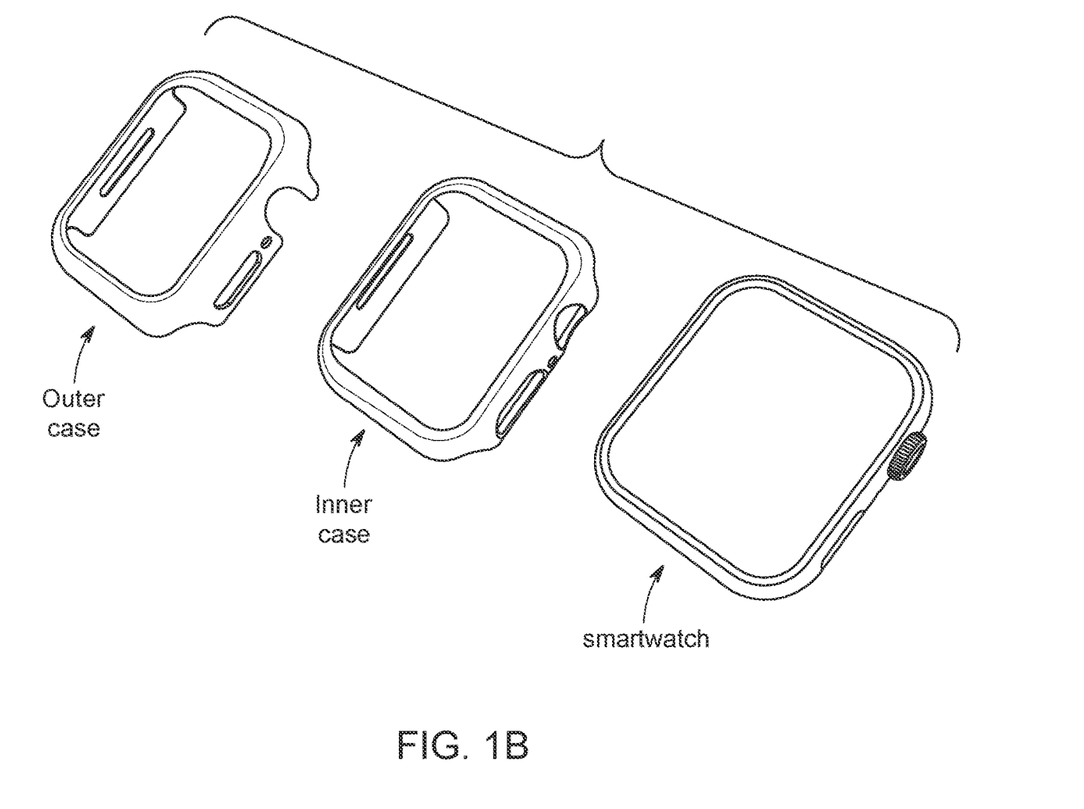
FIG. 1B illustrates an exploded view of an implementation of the example smartwatch cover on a smartwatch case illustrated in FIG. 1A.
Figure 1C:
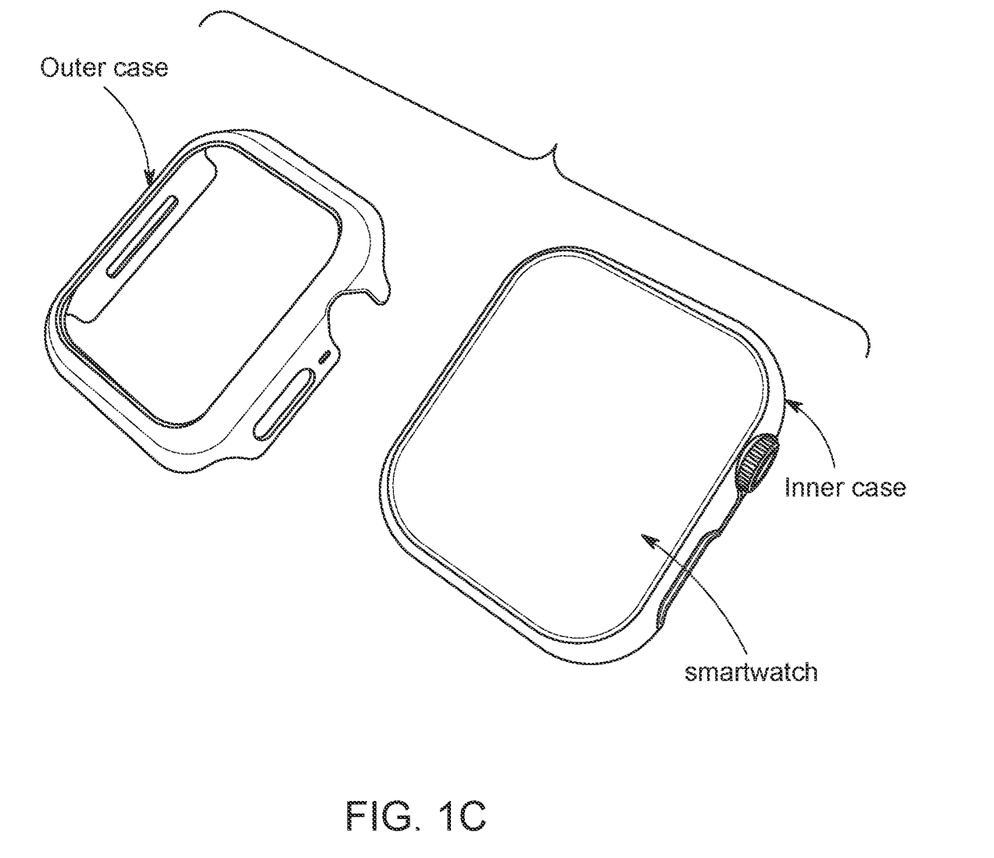
FIG. 1C illustrates a partially exploded view of an implementation of the example smartwatch cover on a smartwatch case illustrated in FIG. 1A.
Figure 1D:
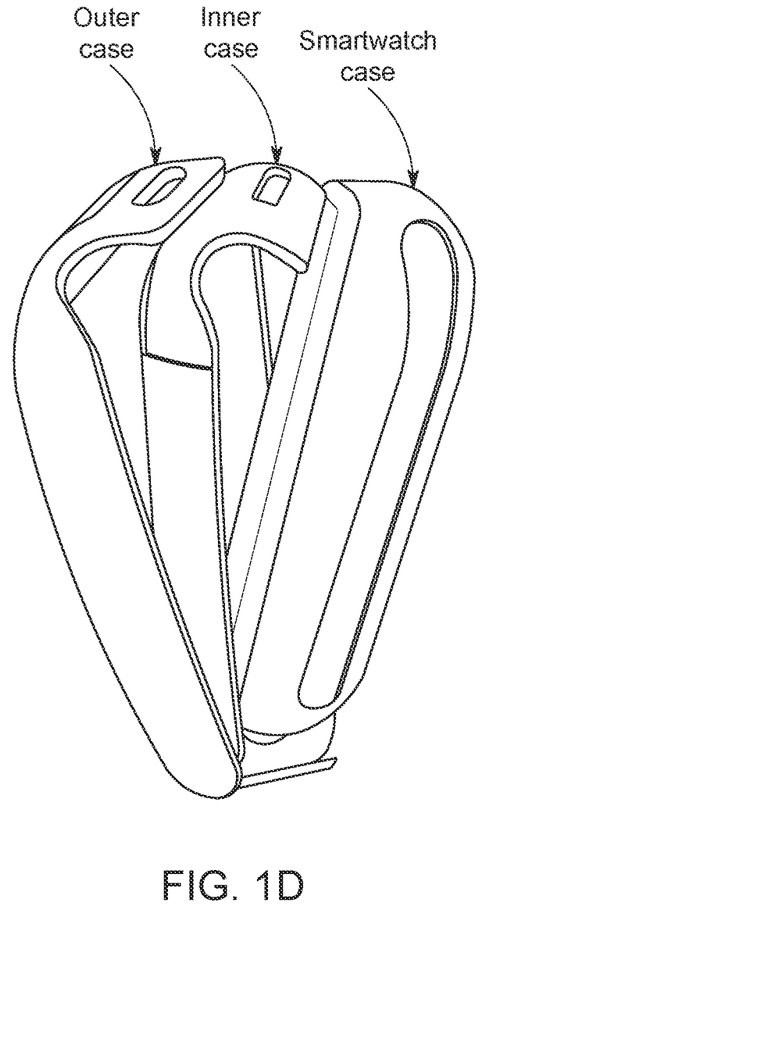
FIG. 1D illustrates a partially an exploded view of an implementation of the example smartwatch cover on a smartwatch case illustrated in FIG. 1A.
Figure 2A:
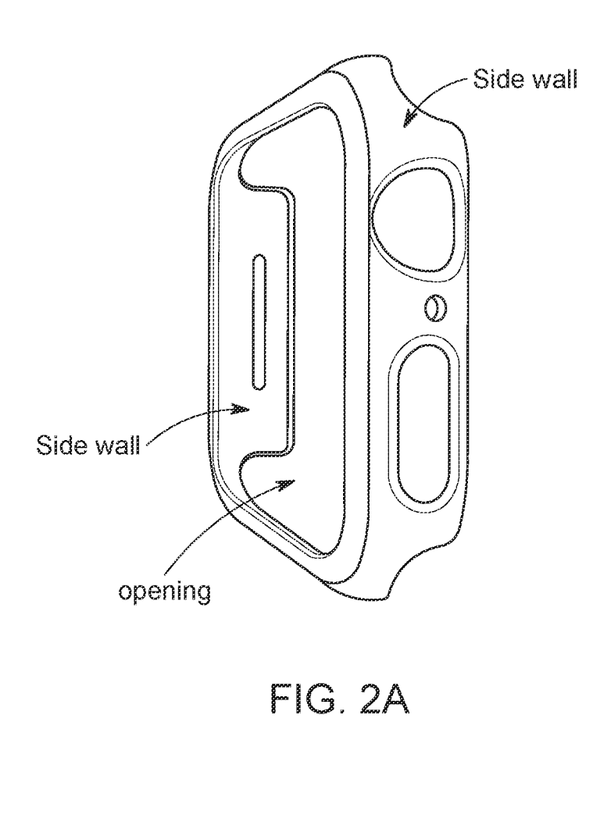
FIG. 2A illustrates front perspective view an implementation of an example flexible inner cover of a smartwatch cover.
Figure 2B:
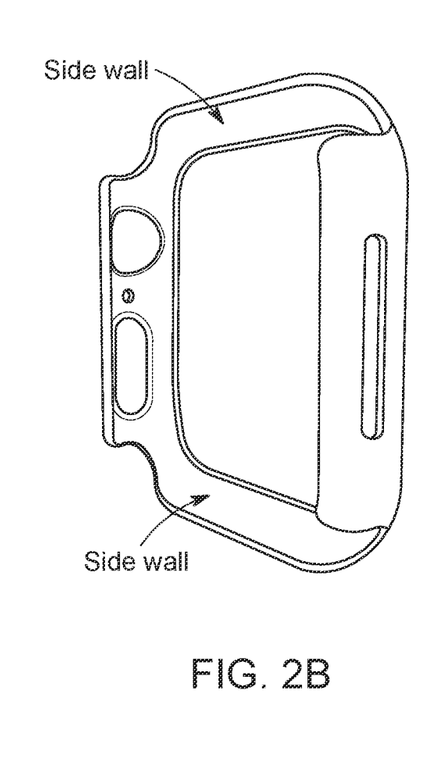
FIG. 2B illustrates back perspective view an implementation of the example flexible inner cover illustrated in FIG. 2A.
Figure 2C:
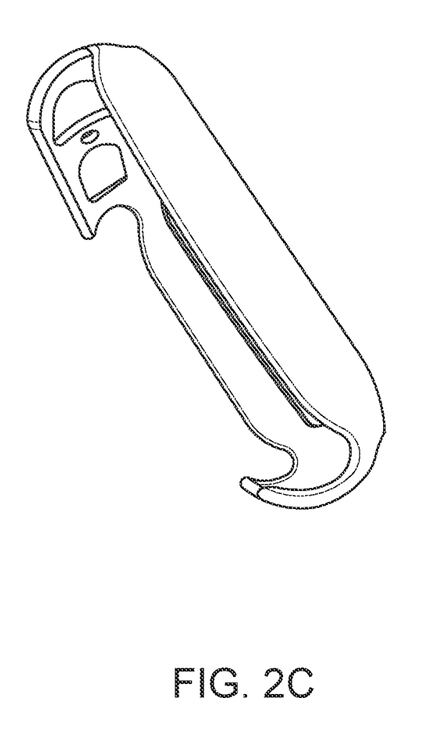
FIG. 2C illustrates side perspective view an implementation of the example flexible inner cover illustrated in FIG. 2A.
Figure 3A:
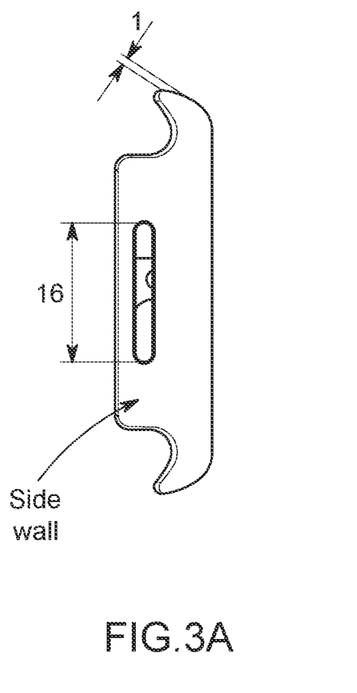
FIG. 3A illustrates side view of an implementation of an example outer cover.
Figure 3B:
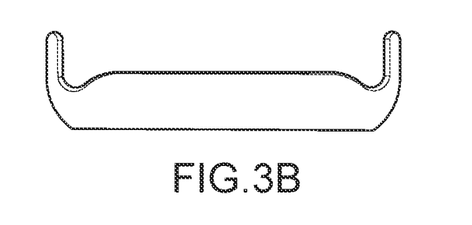
FIG. 3B illustrates a top view of an implementation of the example outer cover illustrated in FIG. 3A.
Figure 3C:
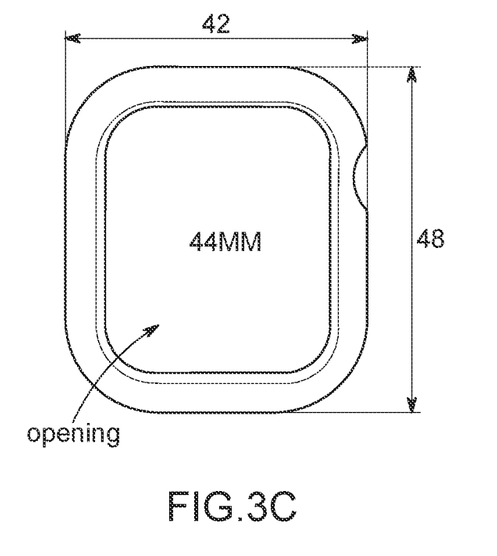
FIG. 3C illustrates a front view of an implementation of the example outer cover illustrated in FIG. 3A.
Figure 3D:
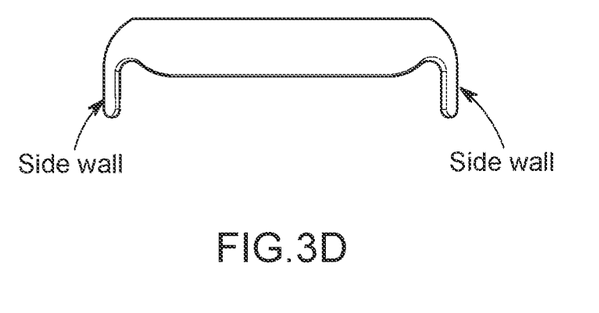
FIG. 3D illustrates a bottom view of an implementation of the example outer cover illustrated in FIG. 3A.
Figure 3E:
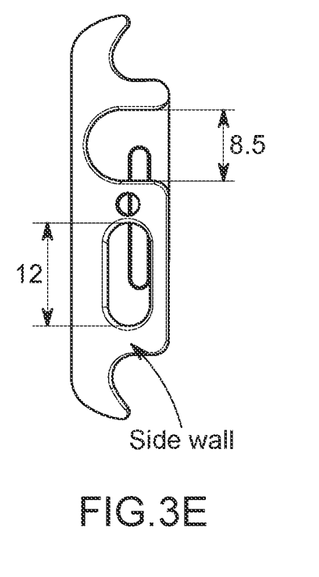
FIG. 3E illustrates a side view of an implementation of the example outer cover illustrated in FIG. 3A.
Figure 4A:
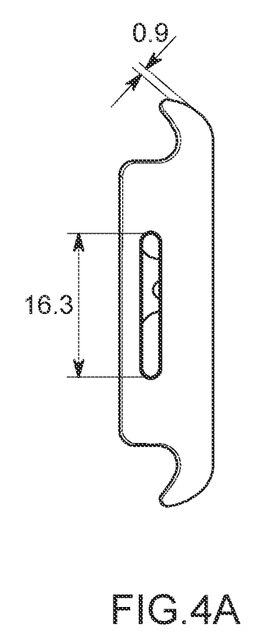
FIG. 4A illustrates side view of an implementation of an example outer cover.
Figure 4B:
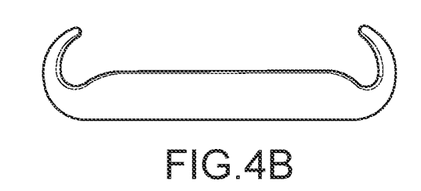
FIG. 4B illustrates a top view of an implementation of the example outer cover illustrated in FIG. 4A.
Figure 4C:
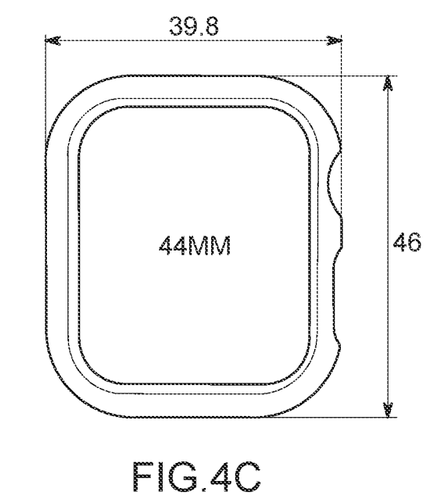
FIG. 4C illustrates a front view of an implementation of the example outer cover illustrated in FIG. 4A.
Figure 4D:
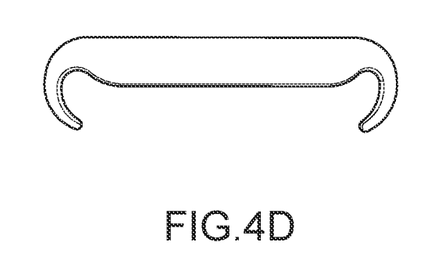
FIG. 4D illustrates a bottom view of an implementation of the example outer cover illustrated in FIG. 4A.
Figure 4E:
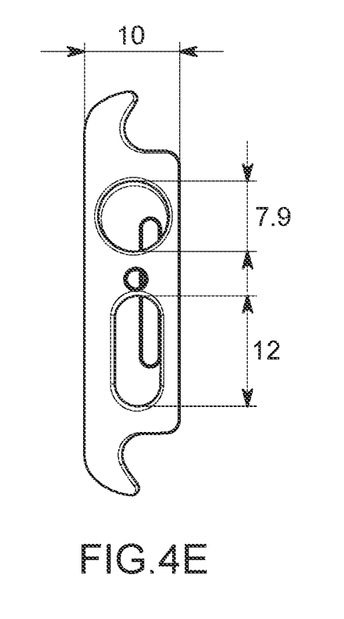
FIG. 4E illustrates a side view of an implementation of the example outer cover illustrated in FIG. 4A.

In various implementations, an interchangeable smartwatch cover may include at least two components, a flexible inner cover and an outer cover. FIGS. 1A-1D illustrate various views of a smartwatch and a smartwatch cover capable of coupling with the smartwatch. FIGS. 2A-2C illustrate various views of an inner cover. FIGS. 3A-4E illustrate various views of outer covers capable of coupling with the inner cover illustrated in FIGS. 2A-2C.

The inner cover and the outer cover may be separate components capable of coupling with each other. In some implementations, the inner cover and the outer cover may be coupled together an operate as a unit.

The inner cover may receive the case or portions thereof of the smartwatch. The inner cover may be at least partially flexible. For example, the inner cover or a portion thereof may be formed of a flexible plastic, rubber, elastomer, and/or any other appropriate material. The inner cover may have a base with an opening through the base. The face of the smartwatch may be viewable through the opening of the base. The opening of the base may be smaller proximate a front side to inhibit a smartwatch case from passing through the opening from the front side when positioned in the smartwatch cover. Side walls may extend from the base. A cavity may reside between the side walls and the base. The length and/or width of the cavity may be larger than the length and/or width of the opening in the base (e.g., to inhibit a smartwatch case from passing through the opening). Apertures may be disposed in side wall(s) that are positioned to align with buttons and/or other components of the smartwatch that a user may access. An aperture may allow access to the buttons and/or other components of the smart watch. For example, the aperture may not inhibit use of user input devices (e.g., buttons, dials, etc.) by users when the smartwatch cover is coupled to the watch. An aperture may protect buttons and/or other components of the smartwatch when the smartwatch cover is coupled to the smartwatch case. The aperture may guard the button or other component disposed proximate the aperture from accidental damage (e.g., damage from hitting other objects, falls, drops, etc.). For example, the wall of the case proximate the aperture may inhibit access to at least a portion of a side of a button and/or other component and thus may reduce the likely hood of accidental damage. The inner cover may have a shape similar to the smartwatch case. The inner cover may have an inner side with dimensions suitable to receive the smartwatch case. The inner cover may be stretched to allow the smartwatch case to be received in the opening of the inner cover. For example, side walls of the inner cover may deform and/or the base may stretch to allow a smartwatch case to be received by the inner cover and couple with the inner cover. An inner cover initially may start in a first shape and be deformed into a second shape to receive the smartwatch case, and then return to the first shape or a third shape while the smartwatch case is disposed in the inner cover. The inner cover is capable of returning to the first shape when the smartwatch case is disposed in the inner cover or when the smartwatch case is removed from the cover. The base may cover at least a portion of a bezel and/or edge of the crystal (e.g., touch screen) of the smartwatch. The base of the inner cover may cover one or more edges of the front face of the smartwatch, as illustrated in FIG. 1C, to inhibit damage to the front edges of the smartwatch. One or more of the side walls (e.g., such as the side walls between opposing bands) may extend at least partially to the back side of the smartwatch (e.g., side that contacts and/or is proximate the arm of a user wearing the smartwatch), as illustrated in FIG. 1D. Extending the sidewalls may facilitate retention of the smartwatch in the inner cover during wear and/or during removal of the outer cover.

The outer cover may receive at least a portion of the coupled inner cover and smartwatch case. For example, the dimensions of the inner portions of the outer cover may be selected such that the inner surface of the outer cover contacts the outer surface of the inner cover. Thus, the outer cover may be disposed on the inner cover, which is disposed on the smartwatch case, in some implementations. The inner surface of the outer cover may have a similar shape as the outer surface of the inner cover to facilitate coupling between the covers. The outer cover may include a base with sidewalls extending from the base. An opening through the base may allow access to the face of the smartwatch (e.g., for viewing and/or providing user input). The opening may be smaller proximate the front side of the outer cover to inhibit the smartwatch from passing through the front side of the outer cover.

The outer cover may be rigid and/or at least partially rigid (e.g., base may be rigid). For example, the outer cover may include rigid plastic, metal, and/or metallic compounds. A rigid outer cover may increase user satisfaction since stones can be inset in the outer surface, since the appearance may resemble more expensive watches, and/or since the rigidness may protect the smartwatch from damage (e.g., due to falls and/or inadvertent contact with other objects).

The outer cover may have an inner shape and/or size to receive the inner cover and a coupled smartwatch. The outer cover may have any appropriate outer shape and/or size. As illustrated in FIG. 3A-3E, the side walls of the outer cover may extend approximately perpendicular from the base. As illustrated in FIGS. 4A-4E, the side walls of the outer cover may curve inward as they extend from the base. Curved sidewalls may provide a streamlined appearance and/or facilitate retention of the smartwatch in the case. For example, the tolerance of the gap allowed between the inner surface of the outer cover may be greater when one or more of the side walls are curved since the curvature may at least partially retain the smartwatch in the outer cover.

In some implementations, the outer cover may be interchangeable. For example, a first outer cover may first be coupled to the inner cover and smartwatch case, and then the first outer cover may be uncoupled from the inner cover while the inner cover and the smartwatch case remain coupled. A second outer cover may then be coupled to the coupled inner cover and smartwatch case. This may allow a user to change an appearance of the smartwatch, replace damage outer covers, etc. As another example, costs associated with a smartwatch may be decreased when the portion of a cover may be replaced rather than the whole cover. For example, as stress due to repeat insertion and/or removal of a smartwatch from the inner cover deteriorate the inner cover, the inner cover may be replaced but the outer covers may not need to be replaced in conjunction with the new inner cover. As another example, if an outer cover becomes damaged (e.g., scratched, dented, etc.), a new outer cover may be obtained rather than a new outer and inner cover.

In some implementations, the inclusions of a flexible inner cover and a rigid outer cover may inhibit damage to the smartwatch during use and/or during coupling or uncoupling of the cover. Since the outer cover is rigid, the sidewalls may exert a pressure as the outer cover is coupled to (e.g., snapped onto) and/or uncoupled from the smartwatch. The flexible inner cover may inhibit damage from the side walls of the outer cover. In some implementations, the flexible inner cover may be capable of absorbing at least a portion of the forces that would otherwise transfer to the smartwatch due to dropping and/or collisions. Thus, the rigid cover and the flexible inner cover may act together to inhibit damage to the smartwatch coupled to the covers.

In various implementations, the inner cover and the outer cover may be coupled such that a user may couple and uncouple (e.g., to the smartwatch case) the inner cover and the outer cover as a unit. For example, the inner cover may be affixed by any appropriate coupling member to the outer cover, such as by adhesive, bonding material, etc. One or more side walls of the inner cover may extend beyond one or more of the side walls of the outer cover, in some implementations. Since the side walls of the inner cover may be flexible, by extending the side walls of the inner cover beyond the outer cover, the smartwatch cover may be more easily coupled to a smartwatch case. For example, the portions of the side walls of the inner cover (e.g., flexible portions) that extend beyond the outer cover may deflect outward as the smart watch case is disposed in the opening of the cover. The flexible portions of the inner cover may be made of a material such that the flexible portions exert a force inward after deflection to more securely hold the smartwatch case in the smartwatch cover (e.g., when compared with a rigid cover).

Dimensions and ratios between dimensions illustrated in FIGS. 3A-3E and 4A-4E are provided as an illustration of an implementation of smartwatch outer covers that can be used with 44 mm smartwatch cases. Other outer covers may have different dimensions. For example, the outer cover may have dimensions based on the size of a smartwatch. As another example, the outer cover may have outer dimensions to reflect an aesthetic style.

In various implementations, the smart watch cover (e.g., inner and/or outer covers) does not inhibit access to buttons and/or other functional features of the smartwatch. In some implementations, the arms of the inner case and/or outer case of the smart watch cover may include recesses, apertures, slots, and/or other features such that access to buttons and/or other functional features of the smartwatch are not inhibited. Aperture(s) in side walls may create cavities in the wall such that the side wall is discontinuous.

In various implementations, the inner cover and/or outer cover may have similar shapes and the inner cover may be smaller (e.g., to allow the inner cover to fit in the outer cover and/or to allow the inner cover to be hidden by the outer cover when coupled together).

In various implementations, the smartwatch cover (e.g., inner and/or outer cover) may have a similar shape to an exterior of a smartwatch case to maintain an aesthetic of the smartwatch case while allowing functional benefits to a user (e.g., ability to change covers quickly and conveniently, protect face of the watch and/or other components, etc.).

Described processes may be implemented by various systems, such as the described smartwatch cover systems. In addition, various operations may be added, deleted, and/or modified. In some implementations, the described processes and/or portions thereof may be performed in combination with other described processes or portions thereof.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a cover" includes a combination of two or more covers and reference to "a flexible material" includes different types and/or combinations of flexible materials.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A watch cover comprising:
    an inner cover and an outer cover;
    the inner cover capable of coupling with a smartwatch case such that the smartwatch case is retained in the inner cover,
    wherein the inner cover comprises:
    a base with an opening disposed through the base, wherein the base is configured to cover at least a portion of a bezel of a smartwatch disposed in the inner cover; wherein the opening has at least one of a smaller length or a smaller width than the smartwatch case disposed in the inner cover;
    one or more side walls extending from the base;
    a cavity disposed between the one or more side walls and the base;
    wherein one or more of the side walls curve inward towards the cavity; and wherein a width of the cavity opening is greater than a width of the opening in the base; and wherein the inner cover is at least partially flexible,
    the outer cover being configured to receive at least a portion of the inner cover, wherein the outer cover comprises:
    an outer base with an outer opening disposed through the outer base, wherein the outer opening at least partially aligns with the opening of the inner cover;
    one or more outer side walls extending from the outer base;
    an outer cavity disposed between the one or more outer side walls and the outer base, wherein the outer cavity is configured to receive the inner cover coupled to the smartwatch case, and wherein one or more of the outer side walls curve inward towards the outer cavity;
    wherein the outer cover is at least partially rigid; and wherein the outer cover is frictionally retained on the inner cover and wherein the inner cover overlays the smartwatch case and the outer cover, in turn, overlays the inner cover.

2. The watch cover of claim 1, wherein at least a portion of the face of the smartwatch disposed in the inner cover is viewable through the opening of the base.

3. The watch cover of claim 1, wherein one or more of the side walls comprises one or more apertures, wherein one or more of the apertures are configured to provide access to components of the smartwatch disposed in the inner cover.

4. The watch cover of claim 1, wherein the one or more side walls do not extend past bands of the smartwatch that may be coupled to the inner cover, when the smart watch is coupled to the inner cover.

5. The watch cover of claim 1, wherein the inner cover is deformable from a first shape to receive the smartwatch case; and wherein the inner cover is capable of returning to the first shape when the smartwatch case is disposed in the inner cover or when the smartwatch case is removed from the inner cover.

6. The watch cover of claim 1, wherein the base is configured to cover at least a portion of at least one edge of a crystal of the smartwatch disposed in the inner cover.

7. The watch cover of claim 1, wherein one or more of the side walls of the inner cover extend to a back side of the smartwatch, when the smartwatch is disposed in the inner cover.

8. The watch cover of claim 1, wherein the outer opening of the outer cover is smaller in width and length than the opening in the inner cover.

9. The watch cover of claim 1, wherein an outer surface of the outer cover comprises inset stones.

10. The watch cover of claim 1, wherein the outer cover does not have a similar outer shape as the smartwatch case.

11. The watch cover of claim 1, wherein the inner cover is at least partially compressed when disposed in the outer cover.

12. The watch cover of claim 1, wherein outer and inner cover at least partially absorb impacts to inhibit damage to the smartwatch.

13. The watch cover of claim 1, wherein one or more of the side walls of the inner cover deflect to allow insertion of the smartwatch case in the inner cover.

14. The watch cover of claim 1, wherein the inner cover further comprises a back opposed to the base and coupled to one or more of the side walls, wherein the back further comprises an opening.

15. The watch cover of claim 14, wherein the opening is deformable to allow a smartwatch case to be disposed in the inner cover.

16. The watch cover of claim 1, wherein the side walls of at least one of the inner cover or outer cover do not inhibit removal of smartwatch bands that are coupleable to the inner cover.

17. The watch cover of claim 1, wherein the inner cover is configured such that arms of the smartwatch do not need to be removed to couple the smartwatch case and the inner cover.

18. An interchangeable watch cover kit, comprising:
    a inner cover capable of coupling with a smartwatch case such that the smartwatch case is retained in the inner cover, wherein the inner cover comprises:
    a base with an opening disposed through the base, wherein the base is configured to cover at least a portion of a bezel of a smartwatch disposed in the inner cover; wherein the opening has at least one of a smaller length or a smaller width than the smartwatch case disposed in the inner cover;
    one or more side walls extending from the base;
    a cavity disposed between the one or more side walls and the base;
    wherein one or more of the side walls curve inward towards the cavity; and wherein a width of the cavity opening is greater than a width of the opening in the base; and wherein the inner cover is at least partially flexible,
    outer covers configured to receive at least a portion of the inner cover, wherein each outer cover comprises:
    an outer base with an outer opening disposed through the outer base, wherein the outer opening at least partially aligns with the opening of the inner cover;
    one or more outer side walls extending from the outer base;
    an outer cavity disposed between the one or more outer side walls and the outer base, wherein the outer cavity is configured to receive an inner cover coupled to the smartwatch case, and wherein one or more of the outer side walls curve inward towards the outer cavity;

wherein the outer cover is at least partially rigid; and wherein the outer cover is frictionally retained on the inner cover and wherein the inner cover overlays the smartwatch case and the outer covers, in turn, overlay the inner cover.

19. The interchangeable watch cover kit of claim 18, wherein each of the outer covers is uncouplable from the inner cover such that one of the outer covers is replaced and the inner cover is coupled to another one of the outer covers in the kit.

20. The interchangeable watch cover kit of claim 18, wherein each of the outer covers is different.

\* \* \* \* \*